(No Model.)
L. DION.
ELECTRICAL PROPULSION FOR RAILWAY CARS.
No. 575,054. Patented Jan. 12, 1897.
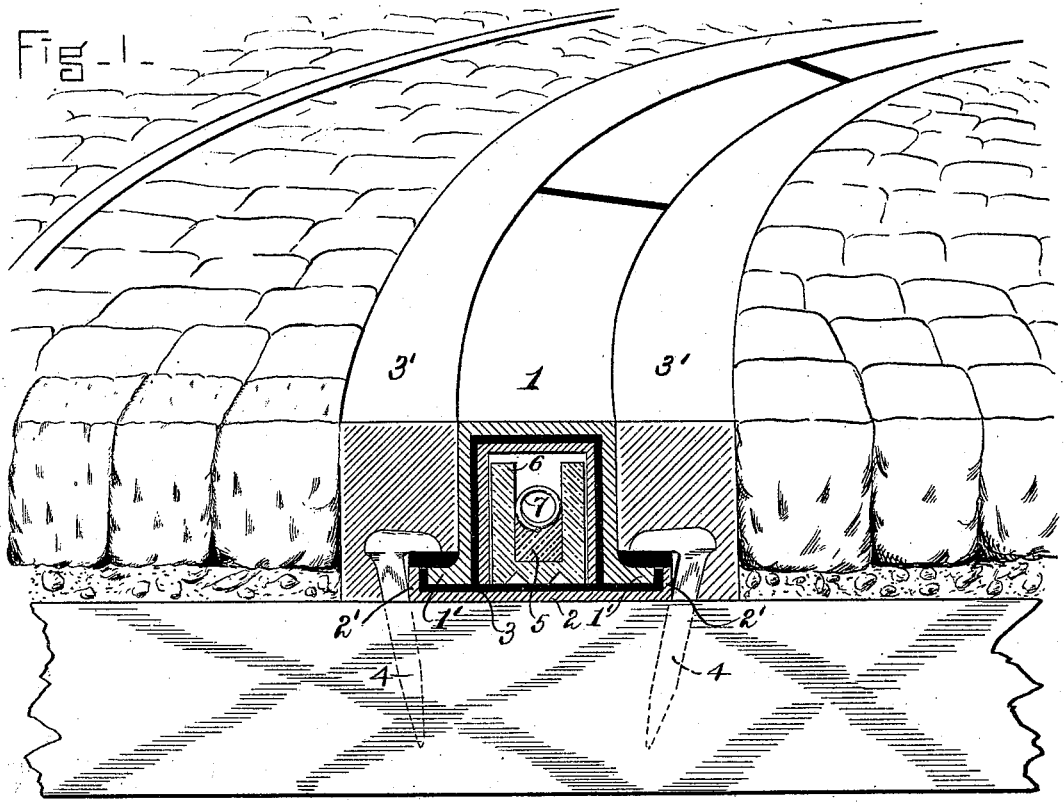
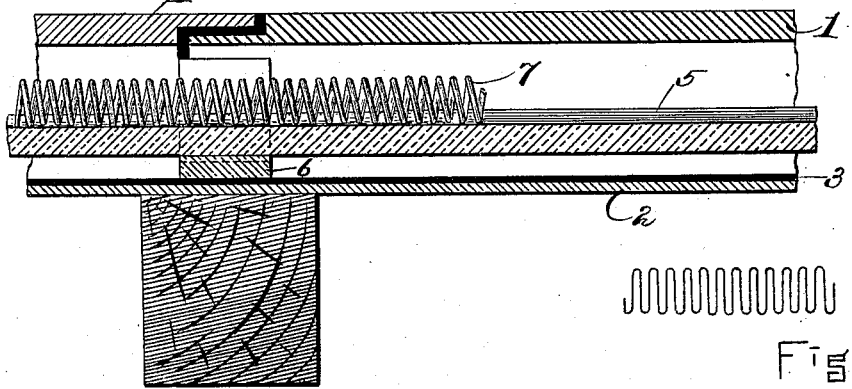
WITNESSES.
D. E. Kempster.
Charles W. Jones.
INVENTOR.
Léon Dion

UNITED STATES PATENT OFFICE.

LÉON DION, OF NATICK, MASSACHUSETTS, ASSIGNOR TO THE MASSACHUSETTS ELECTRIC COMPANY, OF BOSTON, MASSACHUSETTS.

ELECTRICAL PROPULSION FOR RAILWAY-CARS.

SPECIFICATION forming part of Letters Patent No. 575,054, dated January 12, 1897.

Application filed February 27, 1896. Serial No. 581,065. (No model.)

*To all whom it may concern:*

Be it known that I, LÉON DION, a citizen of the United States, residing at Natick, in the county of Middlesex and State of Massachusetts, have invented certain new and useful Improvements in Electrical Propulsion for Railway-Cars, of which the following is a specification.

My invention relates to systems of electrical propulsion for railway-cars of that class shown in my Patent No. 536,855, and also in my pending application, Serial No. 573,734, wherein a main and auxiliary electrical conductor are made use of within a closed conduit or tube.

One object of my present invention is to provide an auxiliary electrical conductor capable of flexibility in all directions and yet having sufficient rigidity to insure its stability in maintaining a symmetrical lateral curvature when used within conduits more or less curved, as is necessarily the requirement in the general construction of electrical conduits for propulsion purposes.

Another object in view is the production of a simple and inexpensive construction of closed conduit.

My invention consists in the improvements in the electrical conductors and in the construction of the closed conduit, all as herein shown and described, and the special features thereof will be plainly pointed out in the claims.

In the accompanying drawings, which form a part of this specification, Figure 1 represents a perspective view of a road-bed having a sharp curve provided with my improved closed conduit, which is cut off to form a cross-sectional view of the same, showing the main and auxiliary electrical conductors supported by insulating chairs or bearings therein. Fig. 2 represents a longitudinal sectional view of the closed conduit, its main and auxiliary electrical conductors, and one of the insulating-chairs therefor. Fig. 3 represents a detail of a modification of the flexible auxiliary electrical conductor.

As my present invention particularly relates to the closed conduit and the electrical conductors, I do not consider it necessary to go into a complete description of all the parts appertaining to the system, as it is in general principles similar to my other applications hereinbefore referred to.

In the drawings hereto annexed, in which like figures of reference indicate corresponding or similar parts wherever they occur, 1 and 2 are the two parts of the conduit, the part 1 being composed of short inverted-U-shaped lengths or sections, and the part 2 a bottom plate having short upwardly-projecting side flanges 2' for retaining the insulating material 3 interposed between the two parts of the conduit, which are securely held together by suitable fastenings or spikes 4, said spikes being also preferably insulated by suitable insulation interposed between the flanges 1' of the upper sections 1 and the offset heads of said spikes, which overlap said flanges and clamp the two parts of the conduit fast to the road-bed. The conduit-sections are properly insulated between their adjoining ends, and are supported on both sides throughout their length by concrete or other suitable filling 3', all as shown in Fig. 1.

Within the conduit, in the lower part thereof, is located the main electrical conductor 5, preferably composed of a metal not susceptible to magnetic attraction, but of good electrical conductivity. Said conductor extends the length of the line and is suitably supported and insulated within the conduit by the insulating chairs or bearings 6.

Upon the upper surface of the main conductor 5 and extending its entire length normally rests the flexible auxiliary electrical conductor 7, formed of a metal having suitable electrical conductivity and also susceptible to magnetic attraction without becoming permanently magnetic. It should be understood that the foregoing description relative to the main and auxiliary electrical conductors and their arrangement within the closed conduit applies also to my former inventions, to which I have before referred.

It has been found in practice that flexible auxiliary electrical conductors as heretofore constructed in the form of a solid or braided metal ribbon adapted to lie flat upon the main electrical conductor do not possess the requisite lateral flexibility to admit of their use in curved conduits. It has also been found that flexible auxiliary electrical conductors made in the form of connected short links, as heretofore used, are not suitable for curved conduits, owing to their too easy lateral displacement and liability to get off the upper surface of the main electrical conductor and into contact with the inner surface of the conduit.

It is absolutely essential in curved conduits having a main and auxiliary electrical conductor adapted for conjoint operation, as employed by me in my systems of electrical propulsion, that the auxiliary electrical conductor should be flexible laterally as well as vertically, and should also possess qualities or characteristics making it capable of maintaining itself in symmetrical lateral curvature coincident with the curve of the conduit without liability to displacement by reason of short or unequal curves or bends.

I produce a flexible auxiliary electrical conductor having all the qualities necessary for its use in conduits having the sharpest curves by making said conductor in the form of a convoluted spring, preferably a helical or spiral spring, as shown in Figs. 1 and 2.

By my present construction of the flexible auxiliary electrical conductor it can be made very cheaply and is easily laid within the conduit, so as to conform to any curve thereof, and by its universal flexibility, together with its inherent quality of resiliency, will, when once laid in the necessary position coincident with the curved conduit, retain its proper shape therein under all the conditions required of it in practical use.

The main electrical conductor I have grooved longitudinally upon its upper surface to conform to the rounding surface of the auxiliary conductor and thus adapt it to better support the latter and make a more perfect electrical contact between the two conductors by reason of the concaved sides of the groove of the former extending around the contacting surface of latter, as shown plainly in Fig. 1.

In Fig. 3 I have shown a modified form of my improved auxiliary electrical conductor in which the spring is flat and convoluted, so as to give it vertical and lateral flexibility and also the necessary resiliency to adapt it to maintain its shape when curved into the required position, and this form or any other modification within the scope of mechanical skill which will possess the essential qualities or characteristics peculiar to my improved flexible auxiliary electrical conductor may be made and used in curved conduits without evading the spirit of my invention.

My improved flexible auxiliary electrical conductor may be picked up and held into electrical contact with the top of the conduit by a traveling magnet connected with the car passing along the track, as shown in my Patent No. 536,855, or said auxiliary electrical conductor may be held up into electrical engagement by a series of electromagnets within the conduit arranged and operating substantially as shown and described in my pending application, Serial No. 573,734, filed December 30, 1895.

By my present construction I produce a closed conduit which can be made and put down very cheaply, there being no extra expense for special devices for attaching the two parts of the conduit together, as the ordinary spiking of the conduit to the road-bed securely clamps the two parts of the conduit together without other fastenings, the lengths or sections of the conduit being used just as they come from the mill or foundry.

My invention is of course susceptible to some changes within the scope of mechanical skill without departing from the essential features thereof and without evading the spirit of the invention.

Having thus fully described the nature and construction of my invention, I desire to secure by Letters Patent and claim—

1. In an electrical-railway system, the combination of a main electrical conductor having its upper surface grooved longitudinally, and a flexible, helically-formed auxiliary electrical conductor adapted to normally rest in the groove of the main conductor, substantially as and for the purpose set forth.

2. In an electrical-railway system, a closed conduit, a helical flexible auxiliary electrical conductor therein, in combination with a main electrical conductor having a concaved groove along its upper surface, for the purpose set forth.

3. In an electrical-railway system, a curved closed conduit, in combination with curved main and auxiliary electrical conductors therein, the auxiliary conductor being a helical spring composed of metal susceptible to magnetic attraction, and the main conductor composed of metal not susceptible to magnetic attraction and formed with a longitudinal guide or groove upon its upper surface for retaining the auxiliary conductor in its normal position, substantially as and for the purpose set forth.

In testimony whereof I affix my signature in presence of two witnesses.

LÉON DION.

Witnesses:
FRED JOY,
D. E. KEMPSTER.